(12) United States Patent
Takenaka et al.

(10) Patent No.: US 7,980,336 B2
(45) Date of Patent: Jul. 19, 2011

(54) OMNI-DIRECTIONAL DRIVE DEVICE AND OMNI-DIRECTIONAL VEHICLE USING THE SAME

(75) Inventors: Toru Takenaka, Wako (JP); Makoto Hirano, Wako (JP); Hideharu Izumi, Wako (JP); Kazuya Kuwabara, Wako (JP); Taiji Koyama, Wako (JP); Shinichiro Kobashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/450,356

(22) PCT Filed: Apr. 8, 2008

(86) PCT No.: PCT/JP2008/000907
§ 371 (c)(1),
(2), (4) Date: Sep. 22, 2009

(87) PCT Pub. No.: WO2008/132778
PCT Pub. Date: Nov. 6, 2008

(65) Prior Publication Data
US 2010/0038960 A1    Feb. 18, 2010

(30) Foreign Application Priority Data

Apr. 20, 2007  (JP) ................................ 2007-112287

(51) Int. Cl.
*B60B 19/14* (2006.01)
*F16H 13/08* (2006.01)

(52) U.S. Cl. ............................ 180/7.1; 180/21; 301/5.23

(58) Field of Classification Search ................ 180/10, 180/20, 7.1, 21; 476/36, 68; 301/5.1, 5.23; 305/6, 7

See application file for complete search history.

(56) References Cited

U.S. PATENT DOCUMENTS

| | | | | |
|---|---|---|---|---|
| 3,746,117 A | * | 7/1973 | Alred | 180/21 |
| 7,730,978 B2 | * | 6/2010 | Dixon | 180/7.1 |
| 2002/0112899 A1 | * | 8/2002 | Dijksman et al. | 180/7.1 |
| 2003/0075366 A1 | * | 4/2003 | Sabatie | 180/7.1 |
| 2005/0183896 A1 | * | 8/2005 | Fenelli et al. | 180/65.3 |
| 2010/0243342 A1 | * | 9/2010 | Wu et al. | 180/7.1 |

FOREIGN PATENT DOCUMENTS

| | | |
|---|---|---|
| JP | 63-31804 (A) | 2/1988 |
| JP | 10-129517 (A) | 5/1998 |
| JP | 2001-191704 (A) | 7/2001 |
| JP | 2005-067334 (A) | 3/2005 |
| JP | 2005-342818 (A) | 12/2005 |
| JP | 10052344777 | * 12/2005 |

* cited by examiner

*Primary Examiner* — Anne Marie M Boehler
(74) *Attorney, Agent, or Firm* — Carrier Blackman & Associates, P.C.; Joseph P. Carrier; William D. Blackman

(57) ABSTRACT

Provided is an omni-directional drive device that does not complicate the arrangement for a power source for a drive source such as an electric motor, and achieves a high durability and an ease of maintenance. A drive force in a first direction is produced by a movement of a first moveable member (10) itself, and a drive force in a second direction is produced by the rotation of first free rollers (14) retained by the first moveable member, the rotation of the first free rollers (14) being caused by engagement with second free rollers (15) that are retained by a second moveable member (11) and rotative actuation of the second moveable member (11). Electric motors serving as drive sources may be mounted on base members (4 and 5).

13 Claims, 15 Drawing Sheets

OMNI-DIRECTIONAL DRIVE DEVICE AND OMNI-DIRECTIONAL VEHICLE USING THE SAME

TECHNICAL FIELD

The present invention relates to an omni-directional drive device that can provide a drive force of any desired direction in a two dimensional environment and an omni-directional vehicle using such a drive device.

BACKGROUND OF THE INVENTION

A drive device for an omni-directional vehicle that can freely move about on a floor is known, for instance, from Japanese patent No. 3820239 (patent document 1). This drive device includes a rotatively driven wheel and a plurality of shafts attached to the outer periphery of the driven wheel and each extending in a tangential direction. A barrel shaped roller divided into a plurality of parts is supported by each shaft so as to be ratable around the shaft, and each barrel shaped roller is engaged to the adjacent rollers so as to transmit the rotational movements of the barrel shaped rollers around the corresponding shaft to one another. One of the barrel shaped rollers is rotatively actuated around the corresponding shaft by an electric motor incorporated in the driven wheel.

In this drive device, the rotation of the driven wheel applies a traction in a fore-and-aft direction (or a direction of the rotation of the driven wheel) to the ground contact surface via each barrel shaped roller, and the rotation of the individual barrel shaped rollers applies a traction in a lateral direction (or a direction of the rotation of the barrel-shaped rollers) via the ground contact surfaces of the barrel shaped rollers. Therefore, by suitably selecting the contributions of the fore-and-aft traction and lateral traction, the vehicle can travel in any desired direction.

BRIEF SUMMARY OF THE INVENTION

Task to be Achieved by the Invention

However, according to this prior art, the electric motor for causing the rotational movement of the barrel shaped rollers supported by the shafts mounted on the periphery of the driven wheel must rotate jointly with the driven wheel. Therefore, the arrangement for supplying electric power to the electric motor from a power source located externally of the driven wheel is inevitably highly complex, and difficult to service and maintain. If the power source is incorporated in the driven wheel, as the electric motor and power transmitting mechanism are already incorporated in the driven wheel, this added complication will make compact design of the device highly difficult. Furthermore, the weight of the driven wheel becomes unacceptably great.

In view of such problems of the prior art, a primary object of the present invention is to provide an omni-directional drive device that does not require a complication of the arrangement for providing a power source for a drive source such as an electric motor, is highly durable and easy to service, avoids an increase in the weight of the rotating (moving) parts, is suited for compact design, and provides a high level of freedom in design, and an omni-directional vehicle using such a drive device.

Means for Achieving the Task

The present invention therefore provides an omni-directional drive device, comprising: a base; a first moveable member and a second moveable member movably supported by the base; a first drive unit and a second drive unit configured to selectively drive the first and second moveable members, respectively; a plurality of first free rollers rotatably supported by the first moveable member arranged along a direction of movement of the first moveable member, each first free roller having a rotation axis extending at a first angle relative to the direction of movement of the first moveable member; and a plurality of second free rollers rotatably supported by the second moveable member arranged along a direction of movement of the second moveable member in such a manner as to come into a rolling engagement with one of the first free rollers as at least one of the moveable members moves along the direction of movement thereof, each second free roller having a rotation axis extending at a second angle relative to the direction of movement of the second moveable member, the first angle being different from the second angle; the first free rollers being adapted to engage a surface of a driving object.

Thus, by actuating only one of the two drive units at an appropriate speed or both of them at appropriate speeds, a drive force of a desired direction can be applied to the object to be driven or actuated.

According to an embodiment of the present invention, the first and second moveable members comprise endless belts extending at an angle relative to each other, each endless belt being passed around a pair of rollers one of which is actuated by the corresponding drive unit.

According to another embodiment of the present invention, the first and second moveable members comprise a pair of annular members having a coaxial center of rotation, each annular member having a peripheral wall rotatably supporting the corresponding rollers.

According to yet another embodiment of the present invention, the first moveable member comprises an annular member rotatably supporting the first free rollers around a central circular line thereof, and the second moveable member comprises a disk member rotatably supporting the second free rollers in the rolling engagement with the corresponding first free rollers, the disk member having a coaxial center of rotation in relation to the annular member.

When the base includes a resilient device for urging the moveable members toward each other for assisting the rolling engagement between the free rollers, a reliable rolling contact between the free rollers can be ensured. If it is arranged such that each first free roller is in rolling engagement with at least one of the second free rollers at all times, a drive force acts upon the first free rollers at all times and free rotation of all of the first free rollers can be avoided. This can be accomplished by providing a larger number of second free rollers than that of the first free rollers when the lengths of the first and second moveable members along the directions of movements thereof are substantially identical to each other. Alternatively, the same goal can be accomplished by providing the second free rollers more densely along the direction of the movement of the second moveable member than the first free rollers.

When the first free rollers engage a road surface or a floor surface as the driving object, the resulting reaction from the road surface or floor surface causes the drive device to be moved in a corresponding direction. Therefore, the drive device can be used as a drive source for an omni-directional vehicle. In such a case, the base may include a payload supporting part. Also, the first free rollers may engage a road surface or a floor surface via a ball that serves as the driving object.

EFFECT OF THE INVENTION

According to an omni-directional drive device embodying the present invention, a drive force in a first direction can be produced by moving the first moveable member, and a drive force in a second direction can be produced by causing a drive force to be transmitted to the first free rollers retained by the first moveable member from the second free rollers through a movement of the second moveable member and thereby turning the first free rollers (each around itself). Thus, by individually controlling the movements of the first moveable member and second moveable member, and combining two vectors directed in the first and second directions, respectively, a drive force of any desired direction can be produced.

As the first drive means for moving the first moveable member and the second drive means for moving the second moveable member are both mounted on the base, the arrangement for supplying power such as electric power to the drive means can be simplified, and this improves durability and ease of maintenance work. Further, the mass of the moveable parts can be minimized, and the structure allows a compact design.

DETAILED DESCRIPTION OF THE PREFERRED EMBODIMENT(S)

First Embodiment

FIGS. 1 to 4 show a first embodiment of the omni-directional drive device of the present invention.

The omni-directional drive device 1 of this embodiment comprises a pair of base members 4 and 5, a first crawler assembly 2 and a second crawler assembly 3.

The first crawler assembly 2 comprises a drive wheel 6 and a driven wheel 8 which are rotatably supported by the base member 4 in a mutually spaced apart relationship in a first direction (X direction), and a first crawler belt 10 consisting of a first endless belt (first moveable member) passed around the two wheels 6 and 8. The first crawler belt 10 includes a plurality of slat pieces 101 that are connected with one another via a hinge into an endless belt.

The second crawler assembly 3 comprises a drive wheel 7 and a driven wheel 9 which are rotatably supported by the base member 5 in a mutually spaced apart relationship in a second direction (Y direction) which is different from the first direction, and a second crawler belt 11 consisting of a second endless belt (second moveable member) passed around the two wheels 7 and 9. The second crawler belt 11 includes a plurality of slat pieces 111 that are connected with one another via a hinge into an endless belt.

The first crawler belt 10 and second crawler belt 11 are in a relationship of linked chains including sections where the two linked chains cross each other one above the other. In other words, the second crawler belt 11 includes a section between the two wheels that crosses a section of the first crawler belt 10 between the two wheels one above the other.

The base member 4 is incorporated with a first electric motor (first drive means) 12 provided with a reduction gear unit which serves as a first rotary drive device for the drive wheel 6. The other base member 5 is incorporated with a second electric motor (first drive means) 13 provided with a reduction gear unit which serves as a second rotary drive device for the drive wheel 7.

Each slat piece 101 of the first crawler belt 10 is fitted with a pair of first free rollers 14 arranged in a parallel relationship and each having a substantially cylindrical shape. The first free rollers 14 engage the object to be actuated or driven, and are each configured to be rotatable around a central axial line C14 extending in a non-perpendicular relationship to the moving direction (X direction) of the first crawler belt 10.

The "non-perpendicular direction" as used herein means that the central axial line C14 of each first free roller 14 (see FIG. 4) extends in a certain direction which is not perpendicular to the moving direction of the first crawler belt 10, or in a direction which is either oblique to or the same as the moving direction of the first crawler belt 10. In the illustrated embodiment, the central axial line C14 of each first free roller 14 is at an angle of $\theta a=45$ degrees with respect to the moving direction of the first crawler belt 10 in an imaginary X-Y plane.

Each slat piece 111 of the second crawler belt 11 is fitted with a second free roller 15 having a cylindrical shape. Each second free roller 15 of the second crawler belt 11 engages a rolling surface (outer circumferential surface) of the corresponding first free roller 14 at a section of the first crawler belt 10 between the two wheels 6 and 8 in a torque transmitting relationship. Each second free roller 15 is configured to be rotatable around a central axial line C15 which is in a twisted relationship to the central axial line C14 of the corresponding (or contacting) first free roller 14. The "twisted relationship" as used herein means a relationship in which a pair of lines (axial lines) in space are not in parallel to each other or cross each other, or not located in a same plane.

More specifically, the central axial line C15 of each second free roller 15 is at an angle of $\theta b=45$ degrees with respect to the central axial line C14 of the corresponding first free roller in a X-Y projected plane. In other words, the central axial line C15 of each second free roller 15 should not be parallel to the central axial line C14 of the corresponding first free roller 14 and, additionally, should not be perpendicular to the moving direction (Y direction) of the inner (second) crawler belt 11.

In the illustrated embodiment, the first crawler belt 10 is provided with two rows of first free rollers 14 extending in parallel to each other, and the second crawler belt 11 is provided with a single row of second free rollers 15. However, the present invention is not limited by this embodiment. The free rollers 14 and 15 were each given with a simple cylindrical shape, but may also be slightly bulging in an axially central part thereof so as to present a barrel shape in view of a smooth operation that can be achieved by such an arrangement.

The two base members 4 and 5 extend in the directions that conform to the arrangement of the first crawler belt 10 and the wheels for the second free rollers 15, and are perpendicular to each other. The two base members 4 and 5 are connected to each other by connecting rods 16 so as to be vertically moveable relative to each other in the vertical direction. Each connecting rod 16 is fitted with a compression coil spring 161. Each compression coil spring 161 resiliently urges the base member 5 downwardly relative to the other base member 4. Thereby, at the intersection of the first crawler belt 10 and second crawler belt 11, the outer circumferential surfaces of the corresponding second free rollers 15 engage the outer circumferential surfaces of the corresponding free rollers 14 at all times at a contact pressure which is greater than a prescribed level or is adequately great to transmit movement (torque transmission) by frictional force.

In the omni-directional drive device 1 of the first embodiment discussed above, suppose that the first crawler belt 10 is kept stationary, and only the second crawler belt 11 is actuated (D1) leftward in FIG. 4 by using the second electric motor 13. In this case, the second crawler belt 11 along with the second free rollers 15 mounted thereon is driven in the same direction (leftward).

Because the first free rollers 14 engage the corresponding second free rollers 15 at their outer circumferential surfaces at an angle of 45 degrees in a twisted relationship, as the second crawler belt 11 travels, the second free rollers 15 are subjected to a counter clockwise rotative force as seen from the direction of arrow A in FIG. 4 owing to a component of the thrust force that act axially to each second free roller 15.

Thereby, the first roller rollers 14 are rotatively actuated in counter clockwise direction, and the frame (base members 4 and 5) of the drive device travels obliquely in leftward and downward direction (D2) in FIG. 4 depending on the oblique angle of the central axial line C14 of the first free rollers 14.

On the other hand, when the second crawler belt 11 is kept stationary, and only the first crawler belt 10 is actuated in upward direction (D3) as seen in FIG. 4 by using the first electric motor 12, because the first free rollers 14 are not rotatively actuated, the frame (bases 4 and 5) of the drive device travels in a direction opposite to the direction of movement of the outer (first) crawler belt 10 or downward as seen in FIG. 4. At this time, because the second free rollers 15 can rotate freely, the resistance that the second free rollers 15 may apply to the first free rollers 14 is negligibly small.

Thus, in the omni-directional drive device 1 of the illustrated embodiment, the movement of the first crawler belt 10 itself produces a drive force in a direction parallel to the first direction (D3), and the application of the rotating force from the second free rollers 15 mounted on the second crawler belt 11 to the first free rollers 14 mounted on the first crawler belt 10 causes a drive force directed in parallel with the second direction (D2). Therefore, by appropriately selecting the directions and circumferential speeds (or the ratio between them) of the first crawler belt 10 and second crawler belt 11, and combining the vectors directed in the first and second directions, a drive force of any direction can be created.

In this case, to ensure that a drive force acts upon (at least one of) the first free rollers 14 at all times and avoid the situation where the first free rollers 14 are all free rolling, it is preferable to ensure that the first free rollers 14 are in a rolling engagement with at least one of the second free rollers 15. In the illustrated embodiment where the lengths of the first and second moveable members are substantially equal to each other, the densities of the first and second free rollers 14 and 15 are appropriately determined, and the second free rollers 15 are more numerous than the first free rollers 14. Alternatively, the density of the second free rollers along the length of the first moveable member may be greater than the density of the first free rollers along the first moveable member.

The omni-directional drive device 1 of the illustrated embodiment actuates the first crawler belt 10 and the resulting reaction force is obtained from a section thereof intermediate between the two wheels, and the rotative actuating force is applied to the first free rollers 14. Therefore, it suffices if the second free rollers 15 are in engagement with the first free rollers 14 in the region located on the side from which the power is obtained (or those on the lower section of the first crawler belt 10 in the illustrated embodiment). To minimize the power transmission loss between the first crawler belt 10 and second crawler belt 11, it is preferable if the upper sections of the first and second crawler belts each between the two wheel are not engaging with each other.

The upper and lower sections of the second crawler belt 11 between the two wheels may be both located inside of the upper and lower sections of the first crawler belt 10 between the two rollers. It is also possible to reverse the relationship between the first crawler belt 10 and second crawler belt 11 or to arrange the rotation axis of each free roller which engages an object to be driven may extend along the length of the corresponding crawler belt.

FIG. 5 shows an embodiment of the omni-directional vehicle of the present invention. The omni-directional vehicle of the illustrated embodiment comprises a box-shaped vehicle body 17 having an open bottom end and a traveling ball 18 received in the vehicle body 17 so as to be able to roll in any direction. A lower part of the traveling ball 18 is exposed from the open lower end 171 of the box shaped vehicle body 17, and rolls over a floor surface 100. The traveling ball 18 is prevented from being dislodged downward from the vehicle body 17 by supporting balls 19 mounted on the parts of the vehicle body 17 adjacent to the open lower end 171 thereof.

An omni-directional drive device 1 is disposed on top of the traveling ball 18 inside the vehicle body 17. The omni-directional drive device 1 fixedly depends from an upper member 172 of the vehicle body 17 so that the first free rollers 14 of the omni-directional drive device 1 are in engagement with the traveling ball 18 at all times in a torque transmitting relationship. Thereby, the traveling ball 18 can be actuated in any direction by the omni-directional drive device 1, and the vehicle body 17 can be moved in any direction.

The contact pressure of the first free rollers 15 on the spherical surface of the traveling ball 18 is produced by the weight of the omni-directional drive device 1 and any load that may be carried by the vehicle body 17.

Second Embodiment

FIGS. 6 to 8 show a second embodiment 2 of the omni-directional drive device of the present invention.

The omni-directional drive device 21 of the illustrated embodiment comprises a base member 26 rotatably supporting an inner wheel member 22 and outer wheel member 23 in a coaxial relationship. The base member 26 is formed as a yoke including a fixed member 26A and a moveable member 26B hinged to the fixed member 26A by a hinge pin 261.

The moveable member 26B of the base member 26 rotatably supports the outer wheel member 22 (first moveable member) via a central pivot shaft 22a. The fixed member 26A of the base member 26 rotatably supports the inner wheel member 23 (second moveable member) via a central pivot shaft 23a in a coaxial relationship to the outer wheel member 22.

To the moveable member 26B of the base member 26 is mounted an electric motor (first drive means) 24 for rotatively actuating the outer wheel. The outer wheel member 22 is integrally and coaxially formed with a pulley (or sprocket) 30. The electric motor 24 for actuating the outer wheel is drivingly connected to the pulley 30 via a belt (or link chain) 32, and rotatively actuates the outer wheel member 22.

To the fixed member 26A of the base member 26 is mounted an electric motor (second drive means) 25 for rotatively actuating the inner wheel. The inner wheel member 23 is integrally and coaxially formed with a pulley (or sprocket) 31. The electric motor 25 for actuating the inner wheel is drivingly connected to the pulley 31 via a belt (or link chain) 33, and rotatively actuates the inner wheel member 23.

The outer wheel member 22 has a frusto-conical shape. A conical peripheral wall of the outer wheel member 22 is fitted with a plurality of barrel shaped first free rollers 27 in a freely rotatable manner at a regular interval along the outer circumference thereof. The first free rollers 27 are free rollers configured to engage an object which is to be actuated, and are each supported so as to be rotatable around a central axial line extending in a non-perpendicular direction with respect to the rotational movement of the outer wheel member 22.

The term "non-perpendicular direction" as used herein means that the central axial line C27 (see FIG. 8) of each free roller 27 extends in a direction other than the direction perpendicular to the rotational direction of the outer wheel member 22, or is oblique to or identical to the rotational direction of the outer wheel member 22. In the illustrated embodiment, the central axial line C27 of each first free roller 27 extends obliquely at an angle of θc=45 degrees with respect to the direction of the movement of the outer wheel member 22 on a corresponding tangential plane of the outer wheel member 22.

The inner wheel member 23 has a frusto-conical shape similarly as the outer wheel member 22. A conical peripheral wall of the inner wheel member 23 is fitted with a plurality of barrel shaped second free rollers 28 in a freely rotatable manner at a regular interval along the outer circumference thereof. The second free rollers 28 are free rollers configured to engage the first free rollers 27, and are each supported so as to be rotatable around a central axial line C28 which is in a twisted relationship to the central axial line of the corresponding first free roller 27. In other words, the central axial line C27 of each first free roller 27 crosses the central axial line C28 of the corresponding second free roller 28 (as projected on the corresponding tangential plane).

More specifically, as seen in a tangential plane (or a projected plane) of the outer circumferential surface of outer wheel member 22 or inner wheel member 23 at which each free roller is located, the central axial line C28 of the corresponding second free roller 28 forms an angle of θd=90 degrees with respect to the central axial line C27 of the first free roller 27 with which the said second free roller 28 engages. In this case also, to ensure that a drive force is applied to the first free rollers 27, and thereby avoid the free rolling of all of the first free rollers 27, the free rollers are arranged such that at least one of the second free rollers 28 are in a rolling contact with each first free roller 27.

In the illustrated embodiment, the central axial lines of the first free rollers 27 and second free rollers 28 are slanted or twisted in mutually opposite directions with respect to the central line, but the present invention is not limited by this example as long as the axial center line of each first free roller 27 that engages an object to be actuated is non-perpendicular to the rotational direction of the outer wheel member 22, and the axial center line of each second free roller 28 is non-perpendicular to the rotational direction of the inner wheel member and non-parallel to the axial center line of the corresponding first free roller 27.

A compression coil spring 29 is interposed between the fixed member 27A and moveable member 27B of the base member 27. The compression coil spring 29 urges the fixed member 27A and moveable member 27B formed as the two legs of the base member 27 toward each other. Because the outer peripheral wall of the outer wheel member 22 carrying the first free rollers 27 and the outer peripheral wall of the inner wheel member 23 carrying the second free rollers 28 both define conical (tapered) surfaces that are tapered in the same direction, the biasing force of the compression coil spring 29 urging the fixed member 27A and moveable member 27B toward each other promotes the contact between the first free rollers 27 and second free rollers 28. Thereby, the second free rollers 28 are enabled to contact the first free rollers 27 in a torque transmitting relationship.

Only a part of the first and second free rollers 27 and 28 located in lower parts of the outer wheel member 22 and inner wheel member 23, respectively, actually contribute to the transmission of a drive force. Therefore, it is also possible to form the outer peripheral walls of the inner and outer wheel members 22 and 23 as true cylinders that are allowed to move vertically relative to each other, and downwardly urge the inner wheel member 23 relative to the outer wheel member 24 so that the pressure of the second free rollers 28 is applied only to those of the first free rollers 27 located in a lower part of the outer wheel member 22.

In the omni-directional drive device 21 of the illustrated embodiment, the central axial lines C27 and C28 of the first free rollers 27 and second free rollers 28 perpendicularly cross each other (as the corresponding pair of rollers engage each other) so that the direction of the drive force that the first free rollers 27 apply to an object to be driven, as seen in the contact surface between them, can be determined at will by suitably selecting the rotational directions and rotational speeds of the inner and outer wheel members 22 and 23.

Referring to FIG. 8, when the inner and outer wheel members 22 and 23 are rotated in the same direction at the same speed by using the electric motors 24 and 25 for actuating the outer wheel and inner wheel, respectively, as there is no relative (rotation) movement between the outer wheel member 22 and inner wheel member 23, neither the first free rollers 27 or the second free rollers 28 rotate around their central axial lines, and a drive force directed along the tangential direction (D4) on the outer periphery of the outer wheel member 22 acts upon the floor surface via the first free rollers 27.

When the outer wheel member 22 is kept stationary while the inner wheel member 23 is turned in clockwise direction as seen from the side of the inner wheel member 23 in FIG. 8, the downward movement, as seen in FIG. 8, of the second free rollers 28 located so as to contact the object to be actuated causes rotative force, which is counter clockwise as seen from the direction indicated by arrow A in FIG. 8, is applied to the first free rollers 27 engaged by the second free rollers 28. As a result, a leftward and downward (D5) drive force defining an oblique angle corresponding to the inclination of the first free rollers 27 acts upon the frame of the drive device.

In other words, by suitably controlling the rotation of the outer wheel member 22 and the rotation of the first free rollers 27 transmitted from the second free rollers 28, the first free rollers 27 mounted on the outer wheel member 22 can produce a drive force of a desired direction in the contact surface of the object to be actuated.

FIG. 9 shows another embodiment of the omni-directional vehicle of the present invention. In FIG. 9, the parts corresponding to those of the embodiment illustrated in FIG. 5 are denoted with like numerals without repeating the description of such parts.

The illustrated direction vehicle is provided with a vehicle body 17 incorporated with an omni-directional drive device 21, and a base member 26 of the omni-directional drive device 21 depends from the vehicle body 17. The omni-directional vehicle mounted on the vehicle body 17 has the first free rollers 27 exposed from a lower end thereof so as to engage the spherical surface of the traveling ball 18 in a torque transmitting relationship.

Thereby, the traveling ball 18 can be rolled by the omni-directional drive device 21 in any desired direction and can hence move the vehicle body 17 in any desired direction.

FIG. 10 shows yet another embodiment of the omni-directional vehicle using an omni-directional drive device according to the present invention.

The illustrated omni-directional vehicle is provided with a pair of steps 34 extending laterally from either side of the base member 26 of the omni-directional drive device 21 (from the fixed member 26A and moveable member 26B, respectively). To the base member 26 (fixed member 26A) is connected a lower end of a pole 35. The upper end of the pole 35 supports a handle bar 36.

This omni-directional vehicle is similar to a monocycle in appearance. A rider places his feet on the steps 34 and holds the handle bar 36 by his hands while the first free rollers 27 of the outer wheel member 22 directly engage the floor surface.

In this embodiment also, by suitably controlling the rotation of the outer wheel member 22 and the rotation of the first free rollers 27 transmitted from the second free rollers 28, the first free rollers 27 mounted on the outer wheel member 22 can produce a drive force of a desired direction in the contact surface of the object to be actuated.

Third Embodiment

FIGS. 11 to 15 show a third embodiment of the omni-directional drive device of the present invention. In FIGS. 11 to 15, the parts corresponding to those of the embodiment illustrated in FIGS. 6 to 8 are denoted with like numerals without repeating the description of such parts.

The omni-directional drive device 41 of the third embodiment is provided with side disks 42 and 43 rotatably mounted on the fixed member 26A and 26B of the base member 26 via central shafts 42a and 43a, instead of the outer wheel member 22 and inner wheel member 23 of the second embodiment. Similarly as the counterparts of the second embodiment, these two side disks 42 and 43 are rotatively actuated by electric motors via a belt/pulley mechanism, and is resiliently urged toward each other.

One of the side disks (first rotatable member) 42 supports an annular shaft 46 via a plurality of arms 45 extending toward the other side disk 43 (rightward in FIG. 11) from a tapered circumferential side surface thereof. A plurality of inner sleeves 47 are fitted on the annular shaft 46 so as to be immobile both along the circumference of the annular shaft and around the axial center of the annular shaft 46. Each inner sleeve 47 rotatably supports a first free roller 49 having a bearing metal 48 integrally formed on the inner circumferential surface thereof.

The first free rollers 49 are configured to engage an object to be actuated, and are fitted on an annular shaft 46 like beads of a rosary through which a string is passed. Each first free roller 49 is freely rotatable around a tangential line of the corresponding part of the annular shaft 46 or around a central axial line of the first free roller 49.

The other side disk 43 (second rotatable member) supports a plurality (eight, for instance) of freely rotatable second free rollers 50 each via a bracket 51 at a regular interval along the circumferential direction. Each second free roller 50 engages the outer circumferential surface of a corresponding one of the first free rollers 49 in a torque transmitting relationship, and is configured to be rotatable around a central axial line C50 which is in a twisted relationship to the central axial line C49 of the corresponding first free roller 49. In other words, the central axial line C49 of each first free roller 50 and central axial line C50 of the corresponding second free roller 50 cross each other (as projected) on the contact surface.

In other words, the central axial line C50 of the second free roller 50 forms an oblique angle of θe=45 degrees with respect to the central axial line C49 of the corresponding first free roller 49 as projected on a contact surface between them.

As shown in FIGS. 13 and 14, the central axial line C50 of each second free roller 50 forms a certain angle relative to the radial line R of the corresponding part of the annular shaft 46 around which the first free rollers 49 rotate, and also forms a certain angle relative to a hypothetical plane S tangential to the central line of the annular shaft 46. This three dimensional inclination of the central axial line of each second free roller 50 is similar to a slanting angle of a skew conical gear based on a conical surface having a certain cone angle.

Owing to this slanting arrangement of the support shaft 52 for each second free roller 50, when the side disks 42 and 43 are rotated relative to each other, the point at which each first free roller 49 contacts the corresponding second free roller 50 is subjected to a frictional force which is directed around the rotation axis of the first free roller 49 and along the circumference of the first free roller 49.

As illustrated in the diagram of FIG. 15, as the outer circumferential surface of a rod B having a circular cross section and rotatable around a central axial line Cb thereof is engaged by a free roller F whose central axial line Cf is slanted with respect to the rod B, and the free roller F is moved along the central axial line Cb of the rod B, owing to the component f of the frictional force acting between the free roller F and rod B at the point of contact between them, the rod B is subjected to a rotational drive force that turns the rod B around the central axial line Cb thereof. In this case also, to ensure a drive force acts upon the first free rollers 49 at all times, and avoid total free rotation of the first free rollers 49, it is desirable that at least one of the second free rollers 50 maintains a rolling engagement with each first free roller 49.

This working principle is described in more detail with reference to the illustrated omni-directional drive device 41. Suppose that one of the side disks 42 is kept stationary and only the other side disk 43 is actuated. In this case, the force directed in the circumferential direction produced by the rotation of the other side disk 43 includes a force component directed around the central axial line C49 of each first free roller 49 which is engaged by the corresponding second free roller 50. Thereby, a drive force which is in parallel with the central axial line of the two side disks 42 and 43 (rightward and leftward in FIG. 11) is made to act upon the contact surface between the first free rollers 49 and an object to the actuated.

When the two side disks 42 and 43 are turned in the same direction at the same speed, as the first free rollers 49 which are engaged by the second free rollers 50 do not rotate around their central axial lines C49, a drive force directed in the rotational direction of the two side disks 42 and 43 is applied to the object to be actuated at the contact surface between the object to be actuated and corresponding first free rollers 49.

By thus individually controlling the rotational speeds and rotational directions of the two side disks 42 and 43, a drive force of any desired direction can be produced at the contact surface between the first free rollers 49 of the side disk 42 and the object to be actuated.

The omni-directional drive device 41 described above can be used as an omni-directional drive device for the omni-directional vehicles illustrated in FIGS. 9 and 10 in a similar way as the second embodiment discussed earlier.

Although the present invention has been described in terms of preferred embodiments thereof, it is obvious to a person skilled in the art that various alterations and modifications are possible without departing from the scope of the present invention which is set forth in the appended claims. The contents of the original Japanese patent application on which the Paris Convention priority claim is made for the present application are incorporated in this application by reference.

Figure 1:
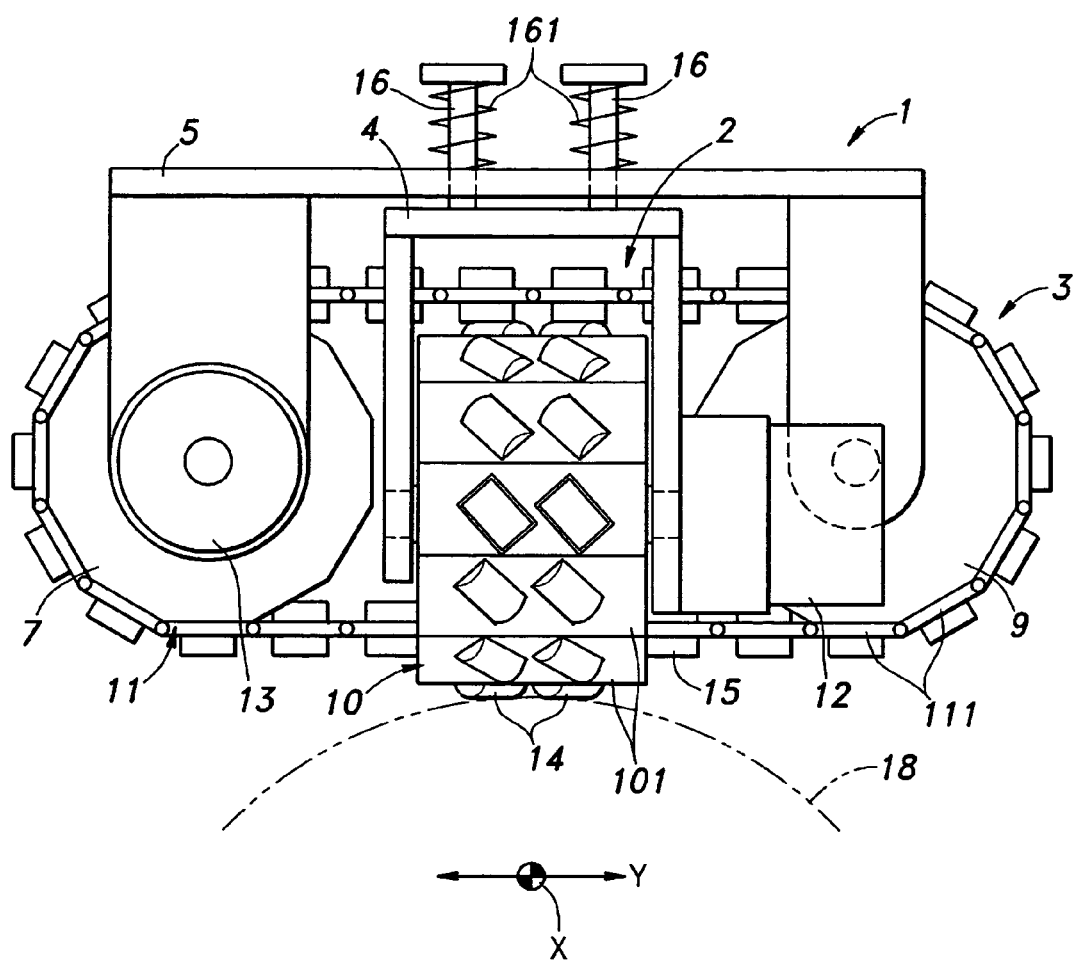
FIG. 1 is a front view of a first embodiment of the omni-directional drive device of the present invention.
Figure 2:
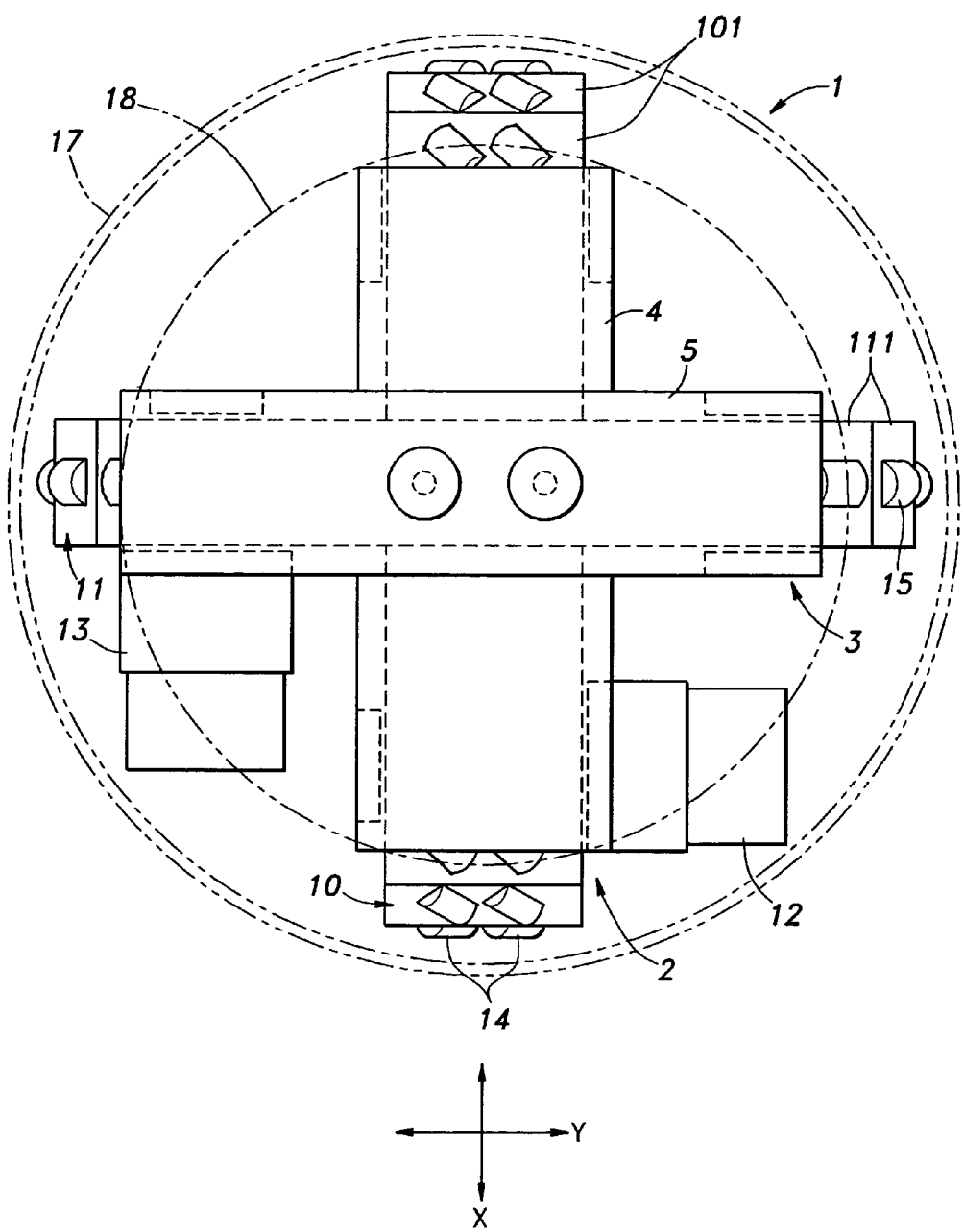
FIG. 2 is a plan view of the first embodiment of the omni-directional drive device of the present invention.
Figure 3:
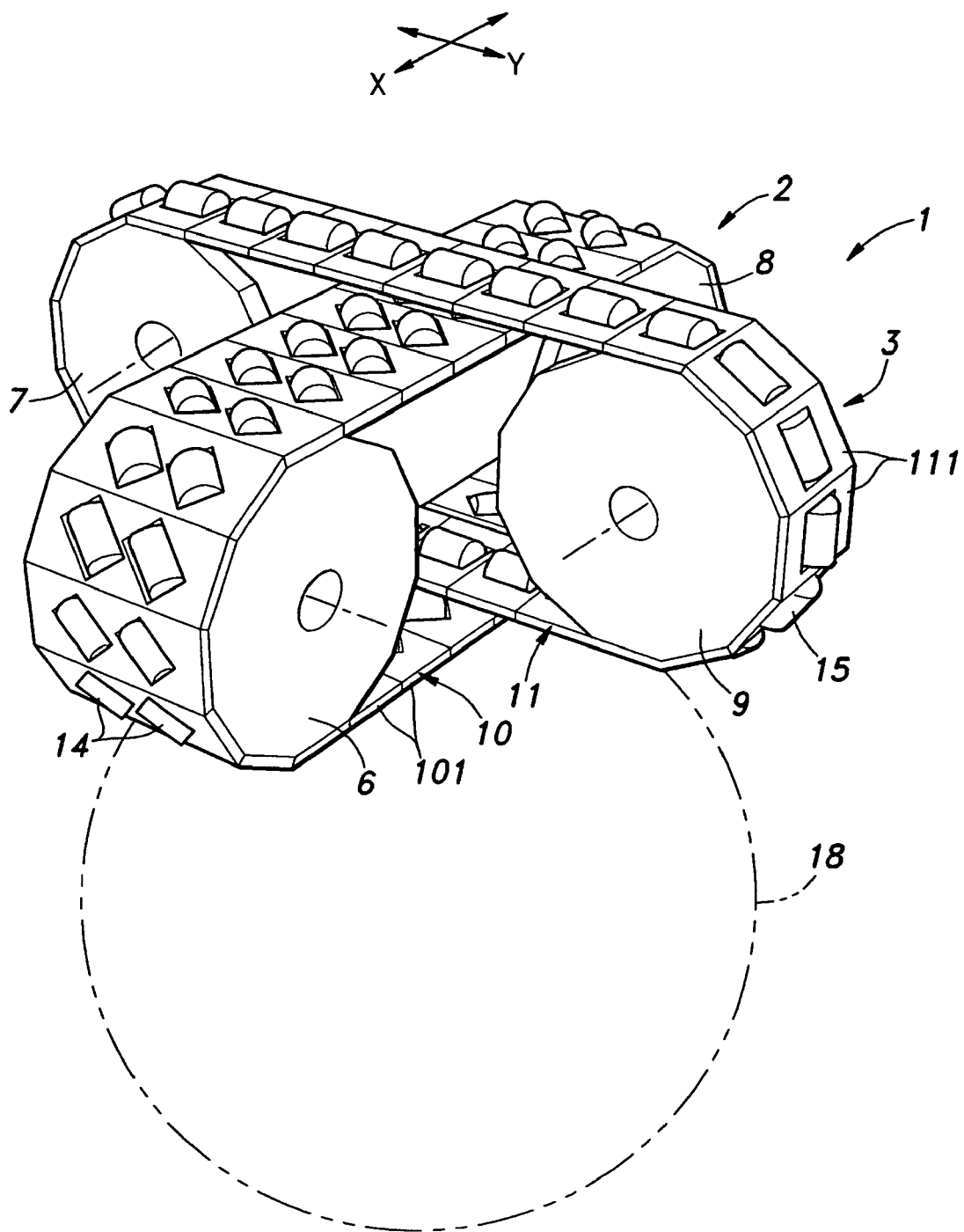
FIG. 3 is a fragmentary perspective view of the first embodiment of the omni-directional drive device of the present invention.
Figure 4:
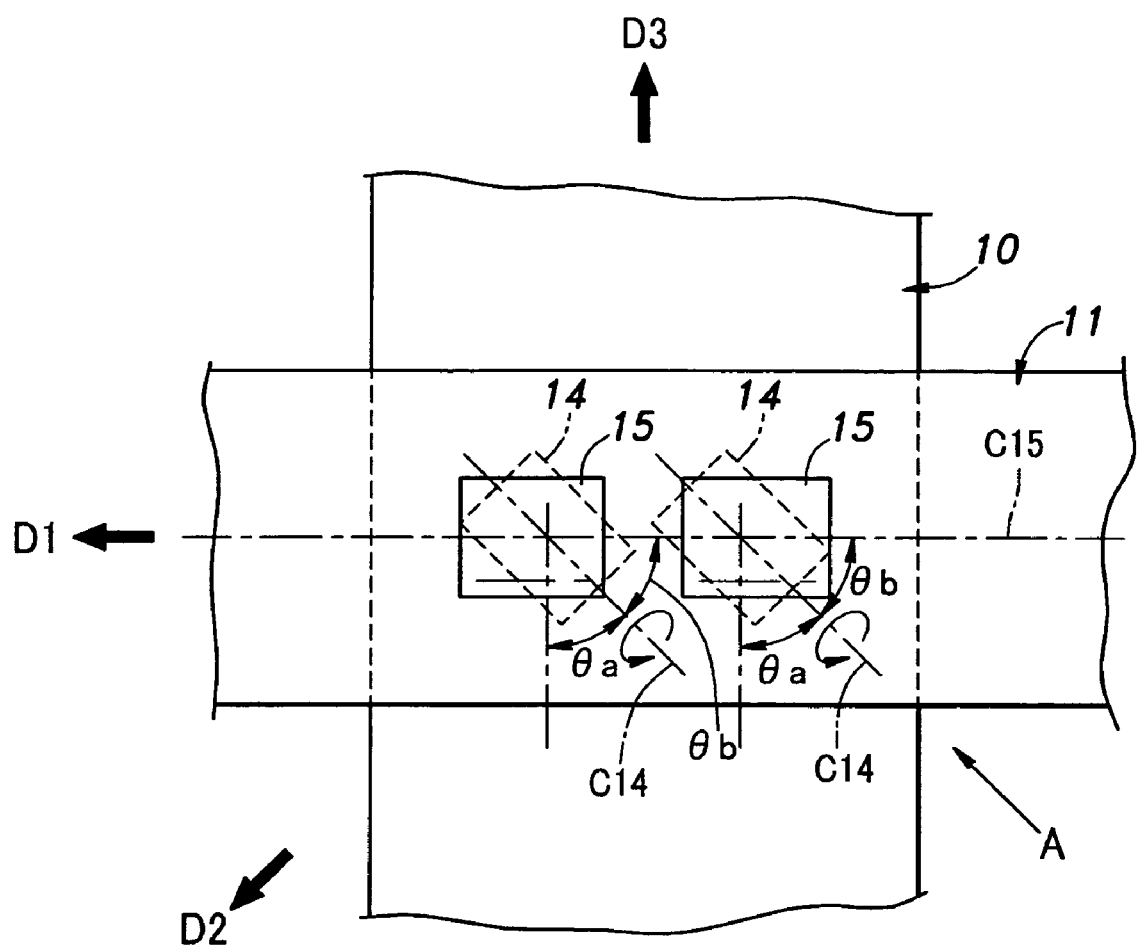
FIG. 4 is a diagram illustrating the mode of operation of the omni-directional drive device of the first embodiment.
Figure 5:
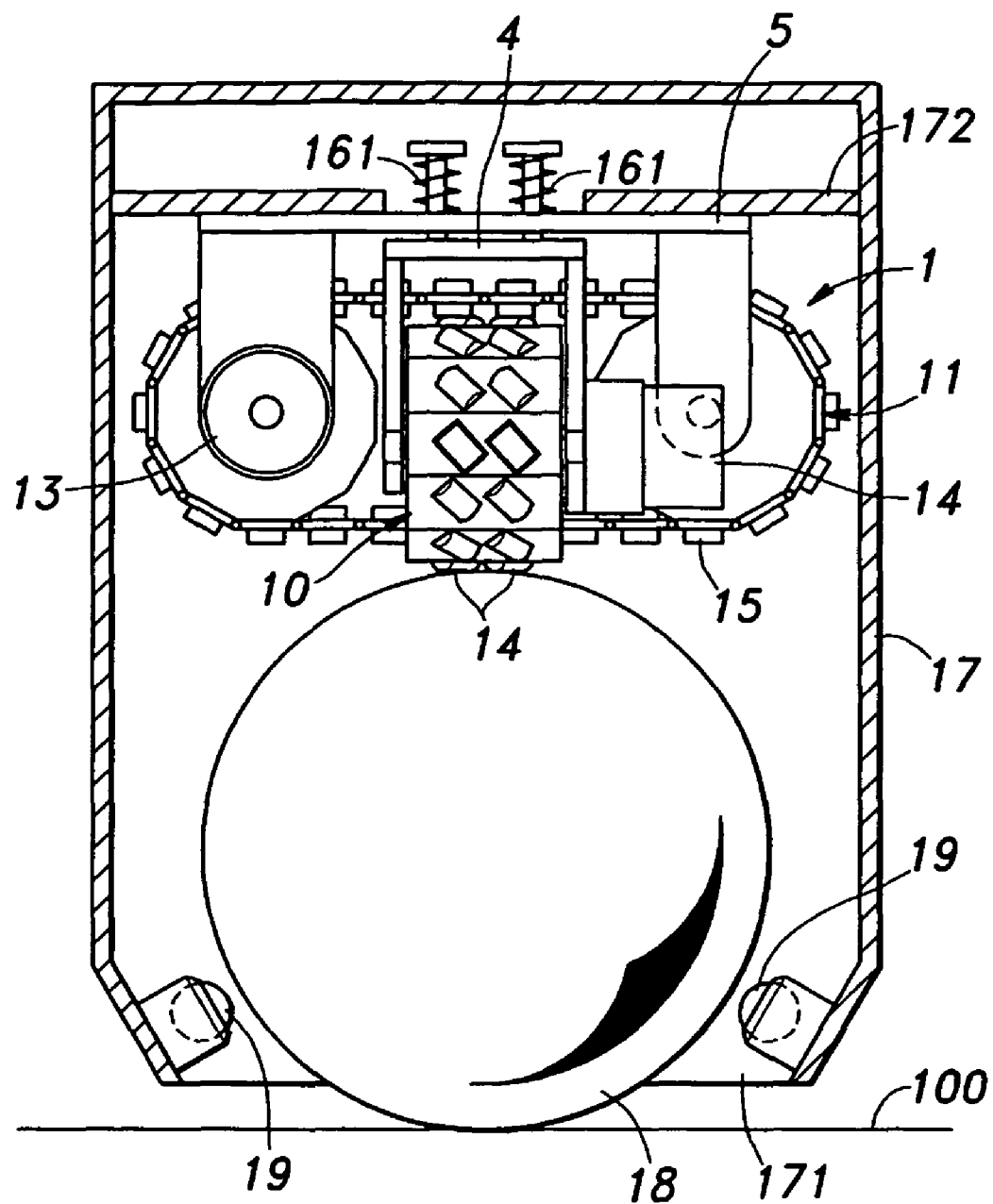
FIG. 5 is an overall view of an embodiment of the omni-directional vehicle according to the present invention.
Figure 6:
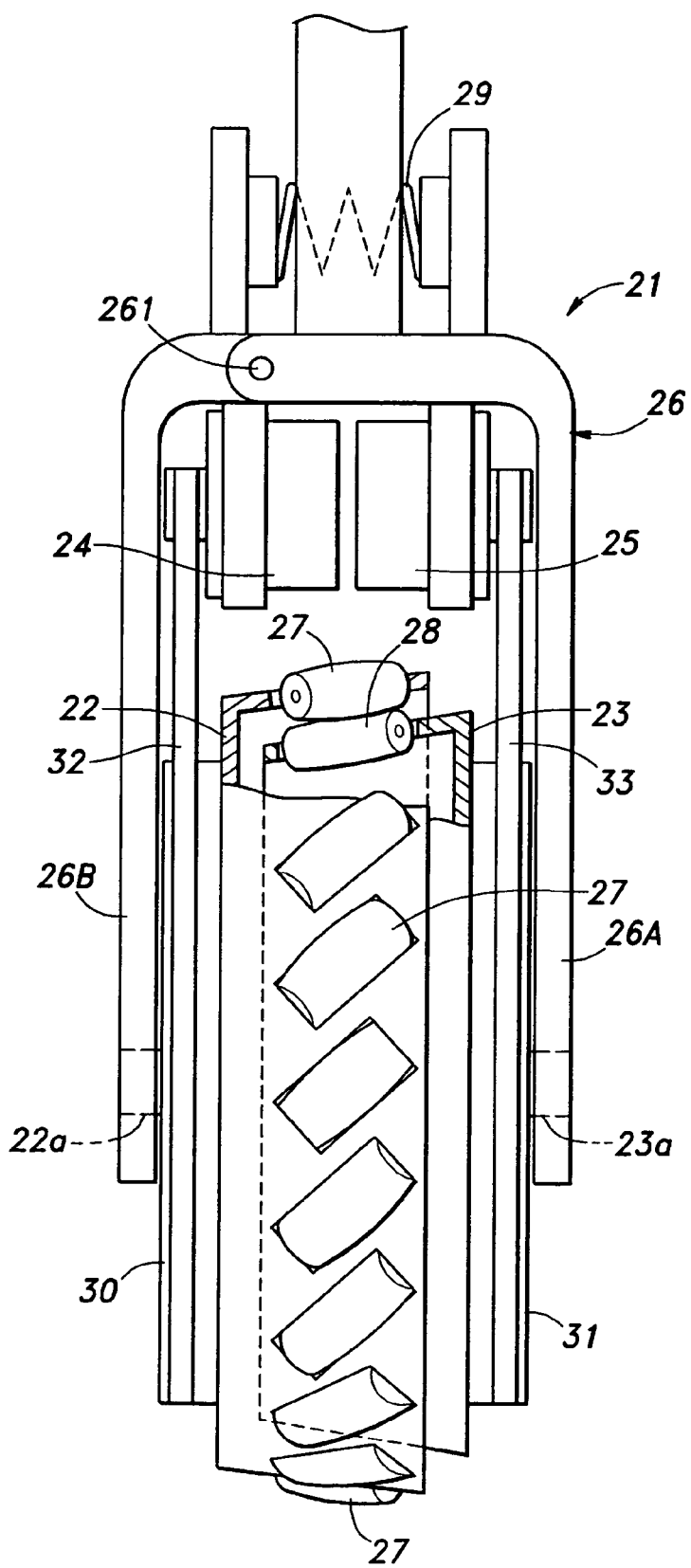
FIG. 6 is a front view of a second embodiment of the omni-directional drive device of the present invention.
Figure 7:
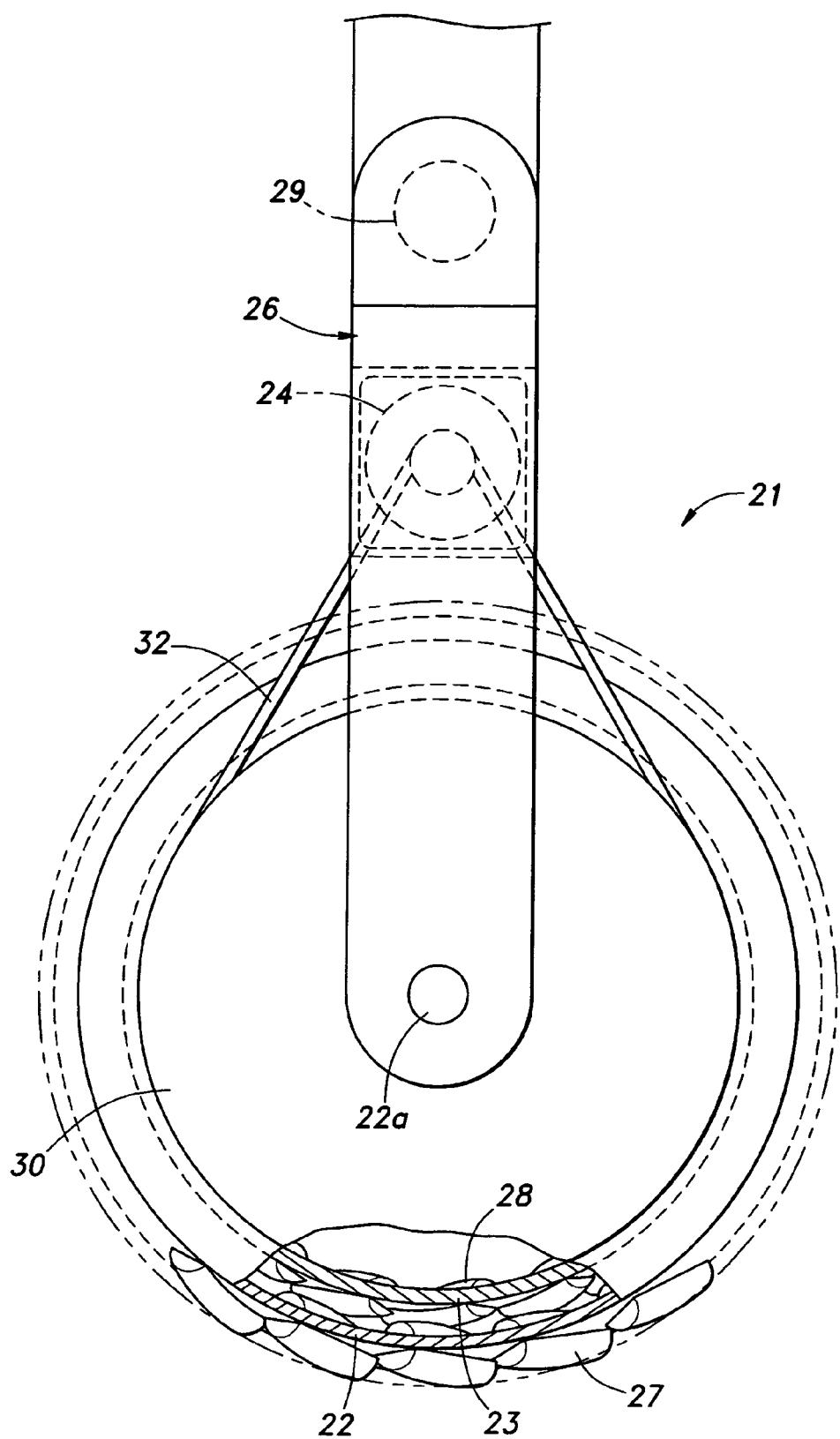
FIG. 7 is a partly broken away left side view of the second embodiment of the omni-directional drive device of the present invention.
Figure 8:
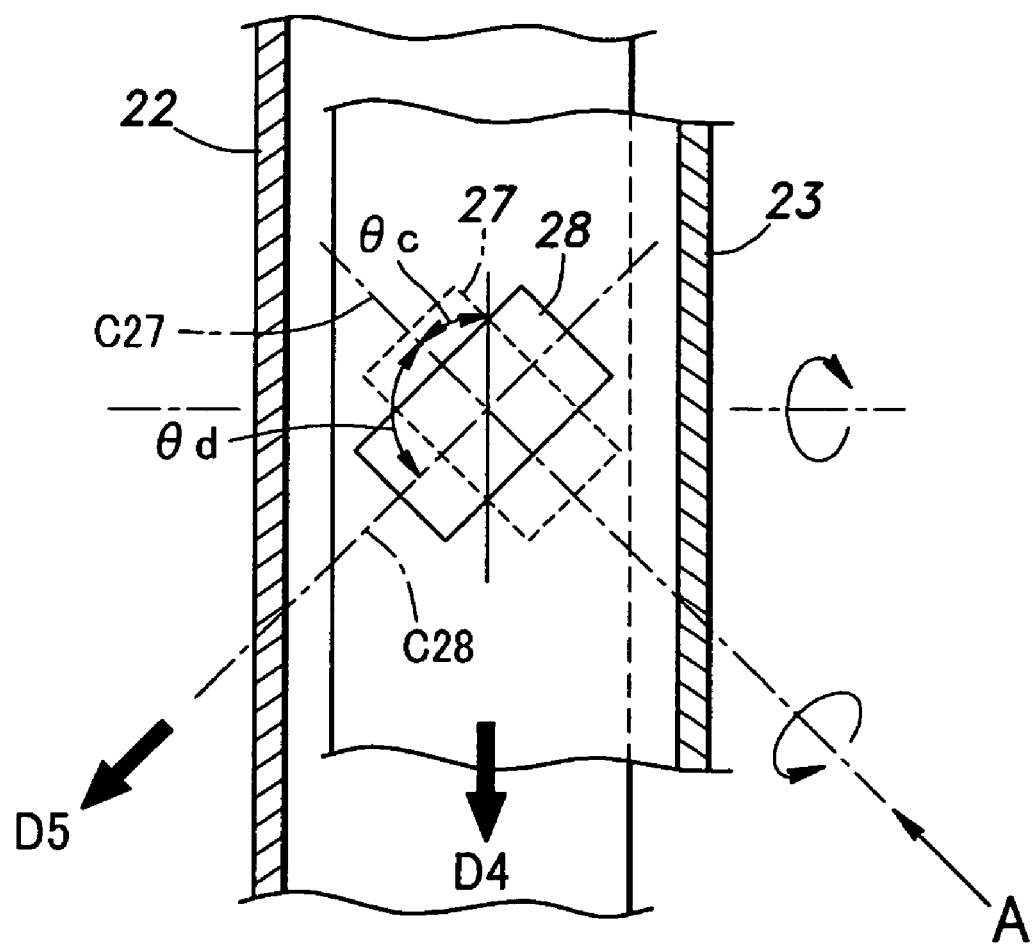
FIG. 8 is a diagram illustrating the mode of operation of the second embodiment of the omni-directional drive device of the present invention.
Figure 9:
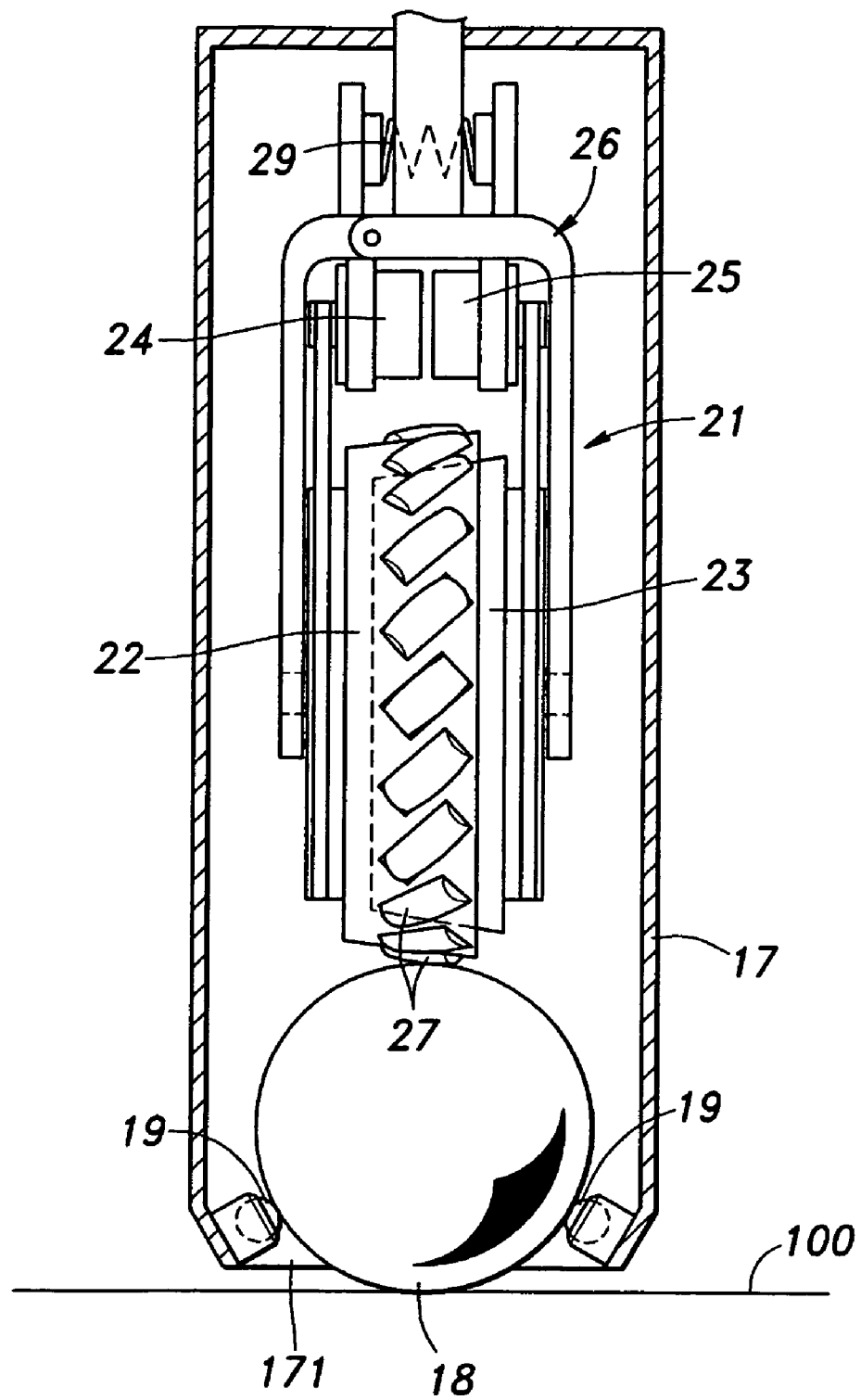
FIG. 9 is an overall view of another embodiment of the omni-directional vehicle according to the present invention.
Figure 10:
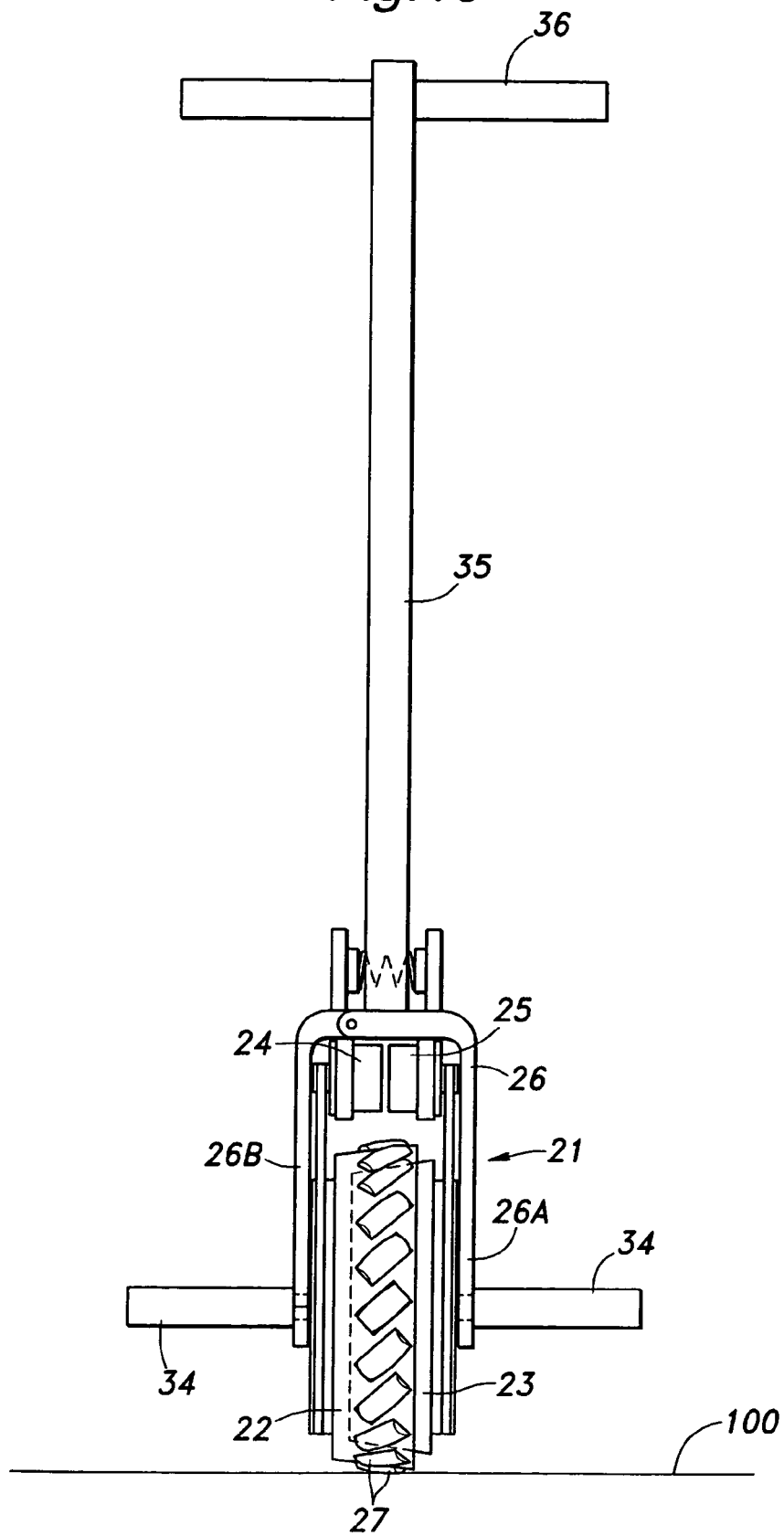
FIG. 10 is an overall view of yet another embodiment of the omni-directional vehicle according to the present invention.
Figure 11:
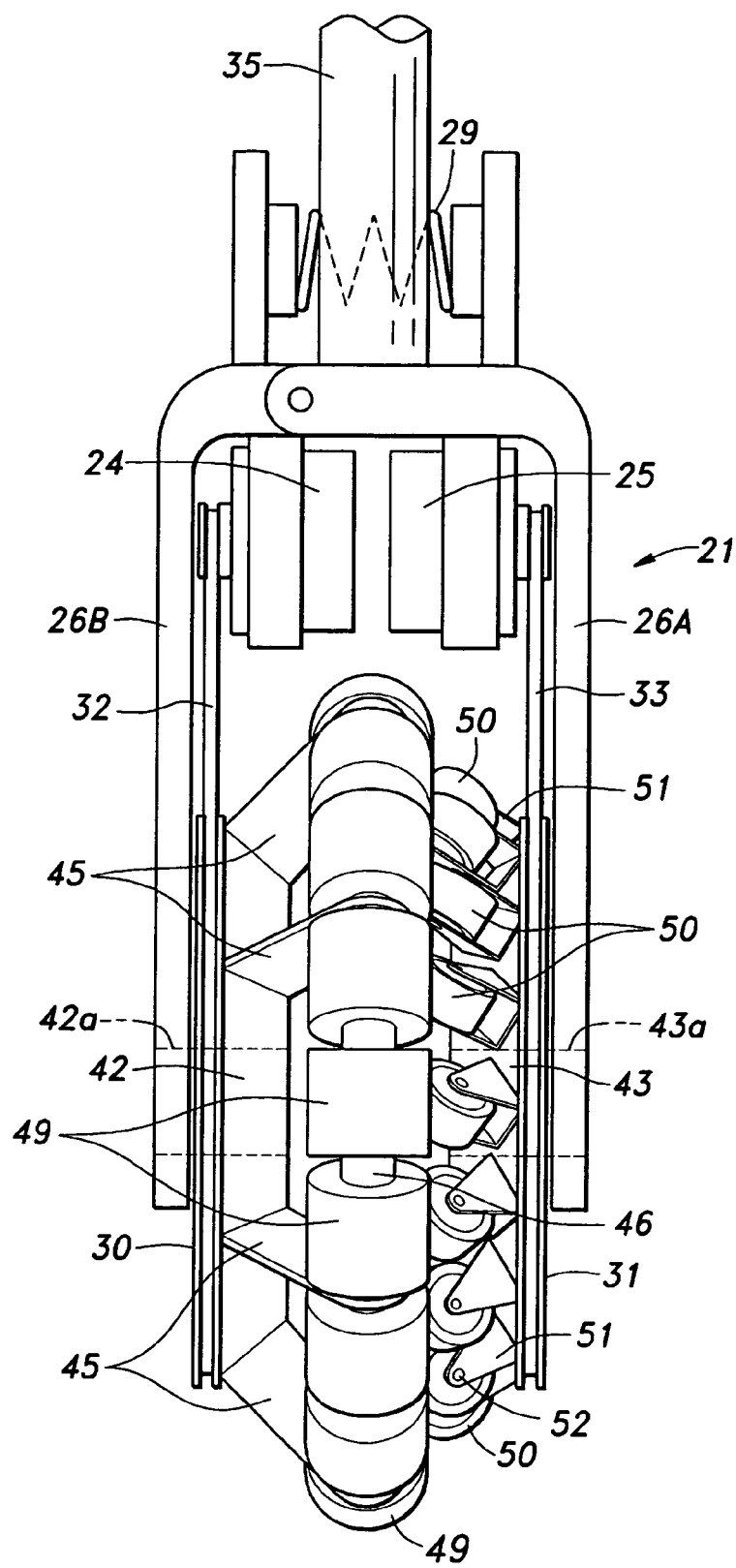
FIG. 11 is a fragmentary front view of a third embodiment of the omni-directional drive device of the present invention.
Figure 12:
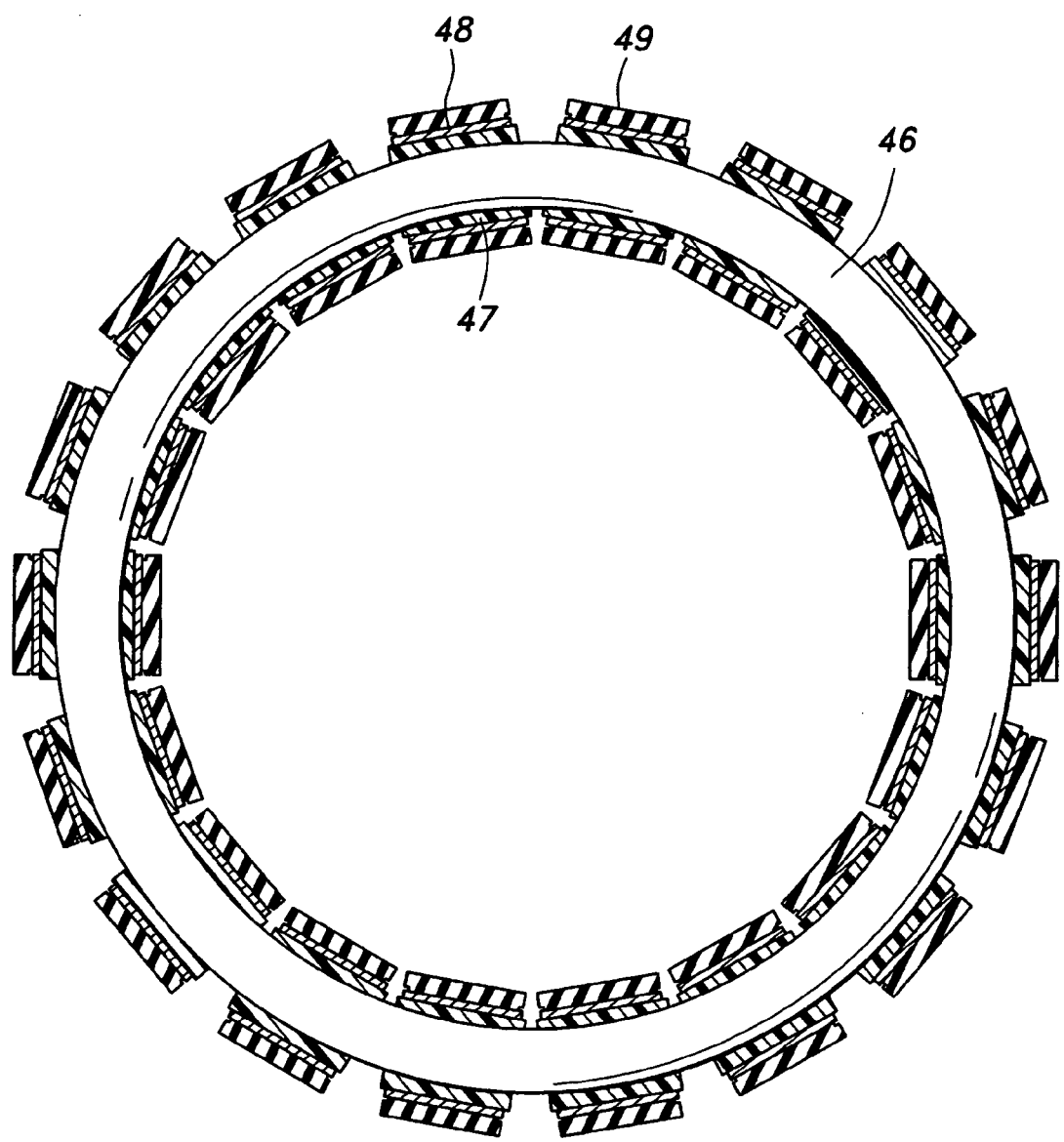
FIG. 12 is a sectional view illustrating the structure of the free rollers used in the third embodiment of the omni-directional drive device of the present invention.
Figure 13:
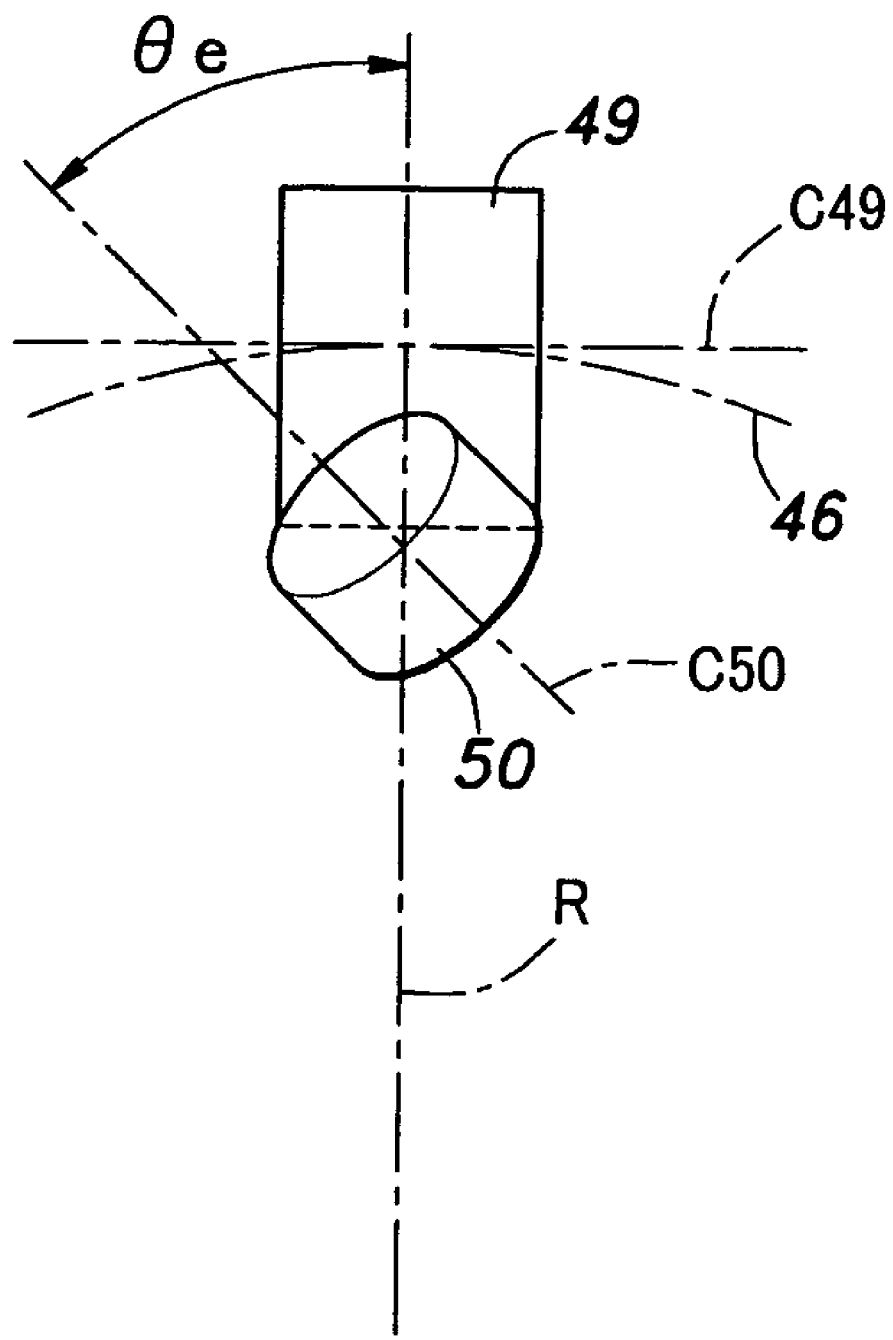
FIG. 13 is an illustrative view showing the orientation of a free roller as seen from the axial direction of the side disk.
Figure 14:
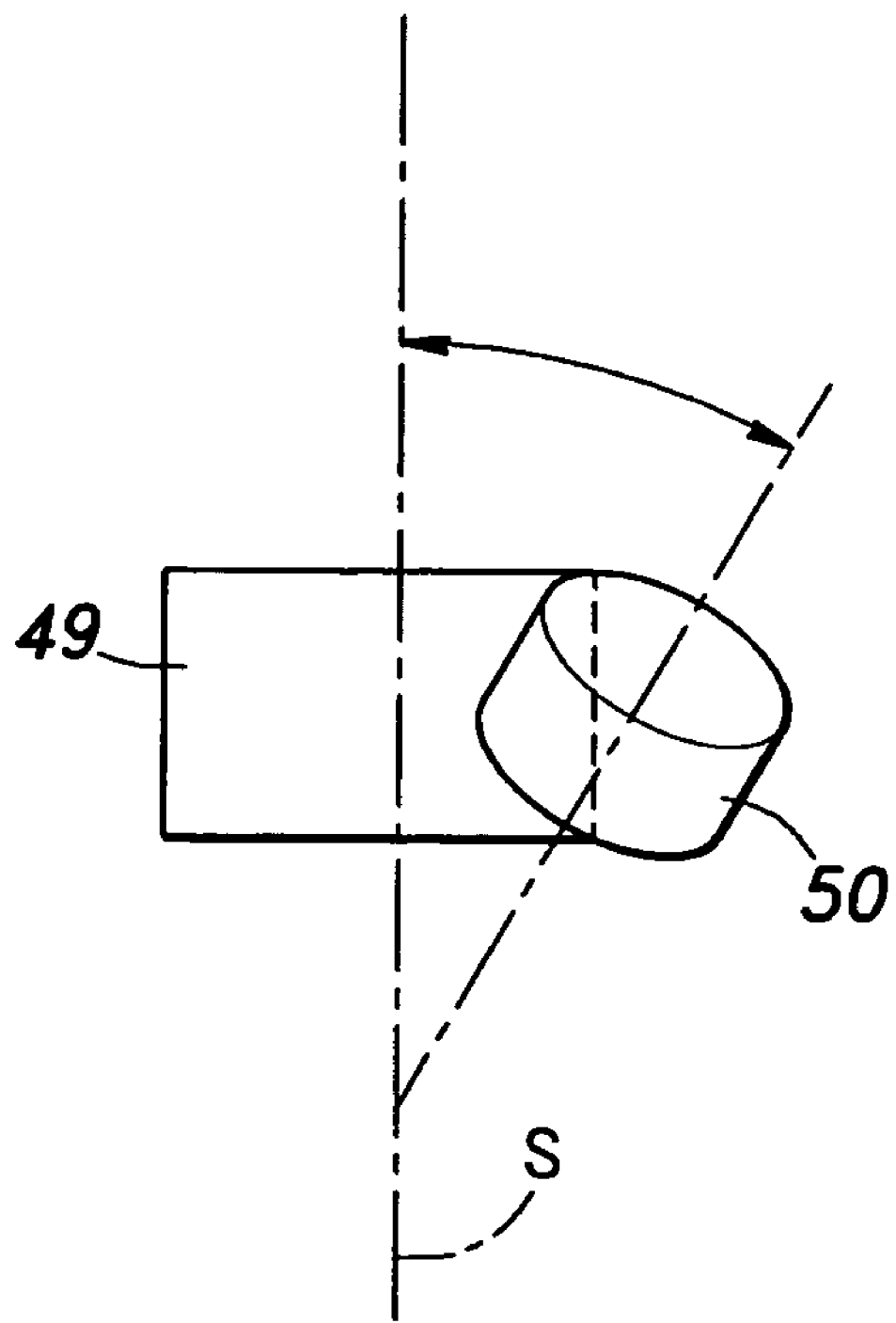
FIG. 14 is an illustrative view showing the orientation of a free roller as seen from the center of the side disk.
Figure 15:
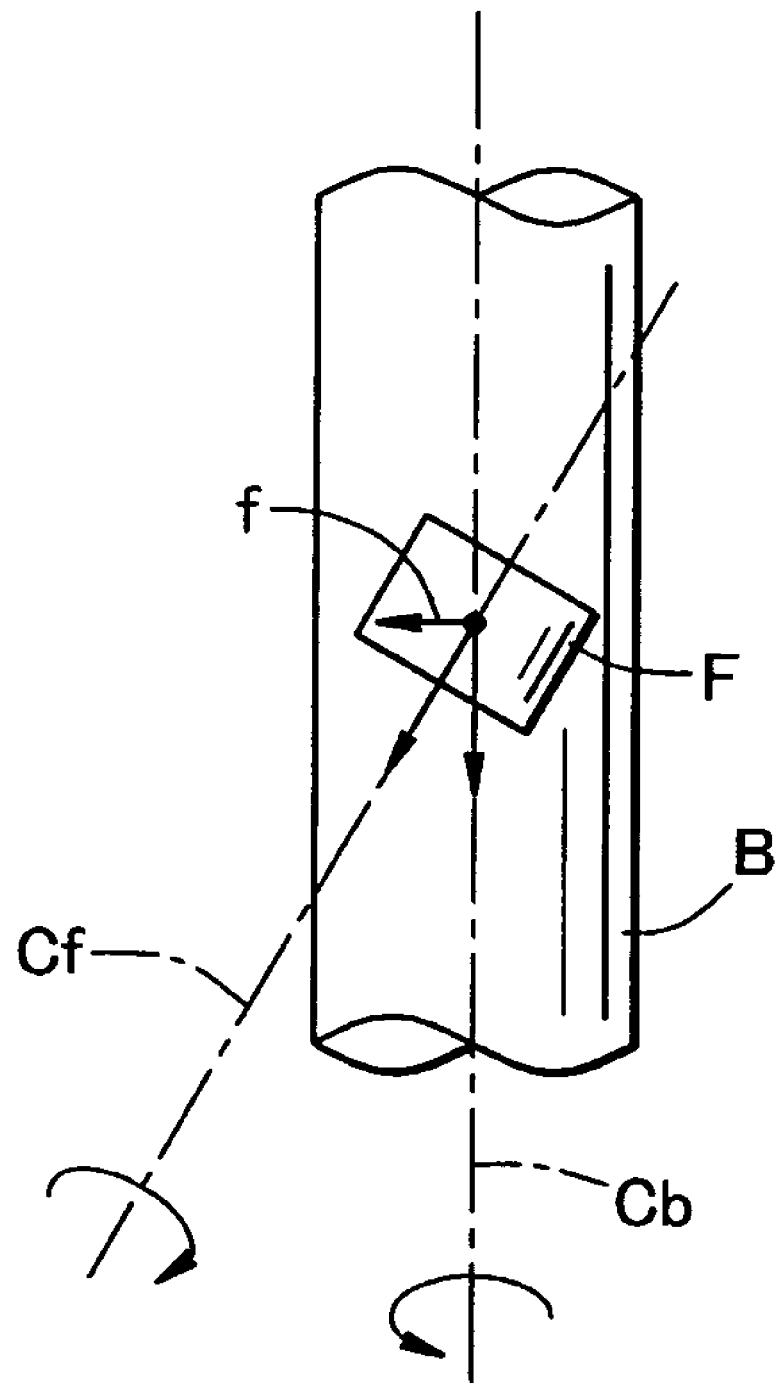
FIG. 15 is a diagram illustrating the mode of operation of the third embodiment of the omni-directional drive device of the present invention.

REFERENCE NUMERALS 1 omni-directional vehicle
4, 5 base member
10 first crawler belt (first moveable member)
11 second crawler belt (second moveable member)
12 first electric motor (first drive means)
13 second electric motor (second drive means)
14 first free roller
15 second free roller
17 vehicle body
19 traveling ball
21 omni-directional vehicle
22 outer wheel member (first moveable member)
23 inner wheel member (second moveable member)
24 electric motor for driving an outer wheel (first drive means)
25 electric motor for driving an outer wheel (second drive means)
26 base member
27 first free roller
28 second free roller
42 side disk (first moveable member)
43 side disk (second moveable member)
49 first free roller
50 second free roller

The invention claimed is:

1. An omni-directional drive device, comprising:
a base;
a first moveable member and a second moveable member movably supported by the base;
a first drive unit and a second drive unit configured to selectively drive the first and second moveable members, respectively;
a plurality of first free rollers rotatably supported by the first moveable member arranged along a direction of movement of the first moveable member, each first free roller having a rotation axis extending at a first angle relative to the direction of movement of the first moveable member; and
a plurality of second free rollers rotatably supported by the second moveable member arranged along a direction of movement of the second moveable member in such a manner as to come into a rolling engagement with one of the first free rollers as at least one of the moveable members moves along the direction of movement thereof, each second free roller having a rotation axis extending at a second angle relative to the direction of movement of the second moveable member, the first angle being different from the second angle;
the first free rollers being adapted to engage a surface of a driving object.

2. The omni-directional drive device according to claim 1, wherein the rotation axis of each first free roller is in a skew relationship with the center line of the corresponding second free roller in the rolling engagement therewith.

3. The omni-directional drive device according to claim 1, wherein the driving object comprises a road surface or a floor surface.

4. The omni-directional drive device according to claim 1, wherein the driving object comprises a ball which in turn engages a road surface or a floor surface.

5. The omni-directional drive device according to claim 1, wherein the first and second moveable members comprise endless belts extending at an angle relative to each other, each endless belt being passed around a pair of rollers one of which is actuated by the corresponding drive unit.

6. The omni-directional drive device according to claim 1, wherein the first and second moveable members comprise a pair of annular members having a coaxial center of rotation, each annular member having a peripheral wall rotatably supporting the corresponding free rollers.

7. The omni-directional drive device according to claim 1, wherein the first moveable member comprises an annular member rotatably supporting the first free rollers around a central circular line thereof, and the second moveable member comprises a disk member rotatably supporting the second free rollers in the rolling engagement with the corresponding first free rollers, the disk member having a coaxial center of rotation in relation to the annular member.

8. The omni-directional drive device according to claim 1, wherein the base includes a payload supporting part.

9. The omni-directional drive device according to claim 1, wherein the base includes a resilient device for urging the moveable members toward each other for assisting the rolling engagement between the free rollers.

10. The omni-directional drive device according to claim 1, wherein each first free roller is in rolling engagement with at least one of the second free rollers at all times.

11. An omni-directional vehicle, comprising the omni-directional drive device according to claim 1, wherein the base includes a payload supporting part.

12. The omni-directional vehicle according to claim 11, wherein the first free rollers engage a road surface or a floor surface as the driving object.

13. The omni-directional vehicle according to claim 11, wherein the first free rollers engage a road surface or a floor surface via a ball that serves as the driving object.

* * * * *